Patented June 24, 1947

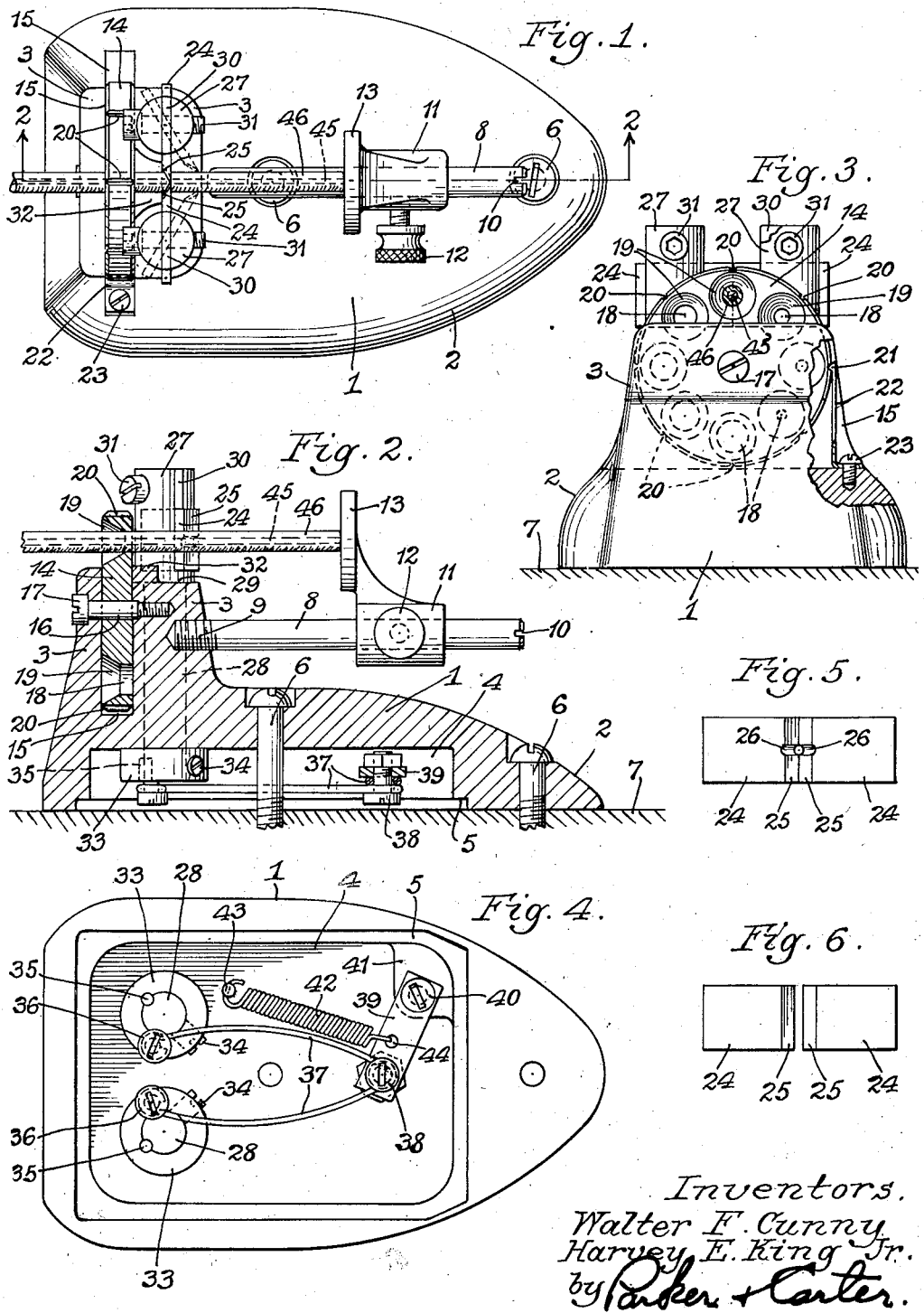

2,422,776

UNITED STATES PATENT OFFICE 2,422,776

WIRE STRIPPER

Walter F. Cunny and Harvey E. King, Jr., Sycamore, Ill., assignors, by mesne assignments, to Ideal Industries, Inc., Sycamore, Ill., a corporation of Delaware Application September 22, 1944, Serial No. 555,299

3 Claims. (Cl. 81—9.51)

This invention relates to a wire stripper and it has for one object to provide a ready and accurate means for stripping insulation from a wire. Where the word "wire" is used, it is to be taken as meaning not merely a single wire, but a plurality of wires, such, for example, as a cable in which many small wires are included, whether as a single group or as strands or the like.

Another object is to provide a wire stripping means suitable for accurate use with wires of different sizes.

A still further object is to provide a gauging or measuring means in connection with such a wire stripper and to arrange the members so that they may be readily adjusted, both as to the size of the wire which is stripped and as to the length of the insulation which is stripped from the wire.

Another object is to provide a bench type of stripper or a stripper which can be fixed to a base.

Another object is to provide means for resisting rotation of rotatably mounted blades and for returning the blades to a neutral or non-rotating position when not in use.

Other objects will appear from time to time throughout the specification and claims.

The invention is illustrated more or less diagrammatically in the accompanying drawings, wherein:

Figure 1 is a plan view showing one form of the device;

Figure 2 is a longitudinal vertical section taken on line 2—2 of Figure 1;

Figure 3 is a front elevation of Figure 1, with parts broken away and parts in section;

Figure 4 is a bottom plan view of the device;

Figure 5 is an elevation of one form of blade suitable for use in this device; and Figure 6 shows a modified form of blade.

Like parts are indicated by like characters throughout the specification and the drawings.

Some form of base is used, and it may have a variety of different shapes. The particular shape of the base shown herewith is not essential. As shown, the base comprises a main section 1 with rounded outline and tapered edges 2. The base is provided with a generally raised portion 3 which serves to support the stripping mechanism and may be of any desired shape. It is preferably integral with the base.

On the under side of the base is formed a cavity 4 which may be shaped to provide a ledge 5 and, if desired, a base plate not shown is positioned to close the cavity 4 and may lie against the ledge 5.

Suitable perforations or openings may be formed in the base to admit screws 6, 6, which screws serve to fasten the base to a support or foundation 7. Obviously nails, bolts or the like might be substituted for the screws.

Secured to the raised portion 3 of the base is a suitable support 8 which may be threaded, as at 9, and notched, as at 10, so that it may be moved into threaded engagement with the portion 3 of the base. Slidably mounted on the support 8 is a member 11 which is provided with a set screw 12 by means of which it is secured in adjusted position on the support 8.

Integrally joined to the member 11 is a stop 13 which is arranged to be contacted by a wire, as will be explained below.

Since preferably the stripper is arranged to receive and to strip insulation from wires of different sizes, an adjusting centering means is provided so arranged that it can be readily moved to the desired position and shaped to receive, guide, and center wires of different sorts. In the particular form here shown this includes a disk or wheel 14 which is mounted in a groove 15 formed in the base section 3 and supported for rotation upon the smooth shank 16 of a screw 17.

At suitable intervals about the member 14 are perforations 18, which perforations are preferably provided with flared enlargements 19. As is clear from Figures 2 and 3, the perforations are of different sizes. The member 14 is provided, preferably in radial alignment with the center of each of the perforations or holes 18, with a notch or indexing member 20. In the particular form here shown, the indexing member is a notch, but obviously other such indexing members might be used. If notches are used, a positioning stop 21 may suitably be arranged to co-operate with the notch and the stop 21 is carried on a spring arm 22 which is secured to the base by a screw 23, or otherwise.

The stripper means includes primarily a pair of blades. Such blades are indicated in Figure 5 and in the form there shown comprise blade portions 24, 24 which may be bevelled or inclined along one face, as at 25, 25. The blades may also be notched, as at 26, if desired, although as shown in Figure 6 they are not shown notched. The purpose of the notch, if one appears, is to embrace the wire from which insulation is being stripped. This is a convenient feature but is not essential and the invention is not limited to its presence.

As shown in Figures 1, 2 and 3, the blades 24, whatever their specific form, are received in slots formed in posts 27. As shown in Figures 1, 2 and 3, the posts are provided with enlargements toward their upper ends and are reduced, as at 28, below the portions 27. Shoulders 29 are formed between the portions 27 and 28 and rest upon the upper surface of the base section or portion 3. If desired, shims 30 may be positioned in the slots in the posts 27 above the blades 24, and the posts are held together or secured against spreading in the slotted portion by means of screws 31, which pass through the shims 30 in case such shims are present. Obviously these shims might, if desired, be dispensed with.

A stop portion 32 may be formed in the upper surface of the base portion 3 and as shown in Figure 2 in dotted lines and as shown also in full lines in Figure 1, the blade 24 will strike against the stop member 32 at one stage of the stripping operation. The reduced portions 28 of the blade posts 27 extend downwardly, as shown in Figures 2 and 4, into the cavity 4 in the base portion 3. Each of them has secured to it a collar 33. The collars are held in position on the post by set screws 34 and are centered or particularly located by pins 35 which fit into corresponding grooves in the posts and collars. The pins serve to insure proper centering or spacing of the collars and the posts.

Pivotally connected to each of the collars 33 by screws 36 are springs 37. These springs are pivotally joined at their opposite ends upon a bolt or similar member 38, which is itself pivoted in the free end of an arm 39, the arm being pivotally mounted at its opposite end upon a screw 40 which is secured upon any suitable portion of the base 1—in the particular form shown in Figure 4, upon a shoulder 41. A tension spring 42 is secured at one end, as at 43, upon the base 1 within the cavity 4 and at its other end, as at 44, it is secured to the arm 39.

Although we have shown an operative form of our invention, it will be recognized that many changes in the form, shape and arrangement of parts can be made without departing from the spirit of the invention, and our showing is therefore to be taken as, in a sense, diagrammatic.

The use and operation of this invention are as follows:

The device as shown is preferably mounted upon some base. It need not be in a horizontal position and can operate if mounted at any angle to the horizontal. Ordinarily it will be mounted either as shown or the base member might be positioned against a wall or in some manner so arranged as to be generally in a vertical position. The spring 42 will tend to restore the blades to the original position whenever it is free to do so, irrespective of the position in which the base is secured.

Assuming now that the stripper is in whatever position suits the operator, the stop 13 is adjusted to the desired position. This position is determined by the length of the insulation which the operator wishes to strip from the wire. Once this has been determined and the stop set to the desired position, the centering and guiding member 14 is moved into position so that a suitable opening is centered. The size of the opening is determined of course by the overall size or approximate over-all size of the wire from which insulation is to be stripped. The member 14 is centered and held centered by whatever indexing device has been included in the mechanism. As shown, this indexing device includes notches 20 and the stop 21 which is yieldingly held against the periphery of the member 14. When the member 14 is in adjusted position, the center of the post perforation 18 is in alignment with the mating edges of the blades 24, and this position is indicated clearly in Figure 3.

With the parts as shown in Figure 3, a wire 45 which has an insulating covering 46 is thrust through the opening 18 which is in position opposite the blades 24. As it is moved through the opening it contacts the blades and moves them from the full line position of Figure 1 to the dotted line position of that figure and it is then moved further until it contacts the stop 13. This determines the length of insulation which is to be stripped from the wire. The operator having moved the wire this far, now pulls or jerks it in the reverse direction. When this reverse movement begins, the edges of the blades 24 cut into the insulation and are carried backward to the original full line position of Figure 1.

As the blades move from the full line position of Figure 1 to the dotted line and back again, the posts 27 of course rotate. As the blades bite into the insulation, they sever it and as the wire is pulled away this severed insulation is stripped from the wire so that the insulation remains on one side, being stripped from the wire by the blades 24, and the stripped portion of the wire is pulled backward between the blades and finally out of the opening 18.

Turning movement of the blade posts from the full line position of Figure 1 to the dotted line position is resisted by the springs 37 and by the spring 42. The spring 42 exerts its resistance equally upon each of the springs 37 because each of these springs is separately pivoted to the arm 39 and the spring 42 is itself secured to the arm 39 and tends to move it in clockwise direction, as shown in Figure 4. Turning movement of the blade posts toward the dotted line position of Figure 1 results in moving the arm 39 in counter-clockwise direction, as shown in Figure 4, and thus expands the spring 42. The spring of course contracts when free to do so and assists in turning the blades and blade posts to their original position, as shown in full lines in Figure 1.

We claim:

1. In combination in a wire stripper, a base, a pair of blades and a carrier for each blade, said carriers mounted for rotary movement in said base, and spring means connected to each of said carriers, and effective, when free to do so, to move the carrier to bring the blades into alignment with each other, and equalizing means effective comprising an arm pivoted on said base, upon said carrier moving means, said equalizing and joined to said carrier moving means.

2. In combination in a wire stripper, a base, a pair of blades and a carrier for each blade, said carriers mounted for rotary movement in said base, and spring means connected to each of said carriers, and effective, when free to do so, to move the carrier to bring the blades into alignment with each other, and equalizing means effective upon said carrier moving means, said equalizing means comprising an arm pivoted on said base, and joined to said carrier moving means, and a spring connected to said arm and connected to said base, and effective yieldingly to resist movement of said arm.

3. In combination in a wire stripper, a base, a pair of blades and a carrier for each blade, said carriers mounted for rotary movement in said base, and spring means connected to each of said carriers, and effective, when free to do so, to move the carrier to bring the blades into alignment with each other, and a stop limiting the movement of the blades in one direction, and equalizing means effective upon said carrier moving means, said equalizing means comprising an arm pivoted on said base, and joined to said carrier moving means, and a spring connected to said arm and connected to said base, and effective yieldingly to resist movement of said arm.

WALTER F. CUNNY.
HARVEY E. KING, Jr.

REFERENCES CITED

The following references are of record in the file of this patent:

UNITED STATES PATENTS

| Number | Name | Date |
| --- | --- | --- |
| 1,784,298 | Mahan et al. | Dec. 9, 1930 |
| 1,902,742 | Wentink | Mar. 21, 1933 |
| 2,054,529 | Wiggins | Sept. 15, 1936 |
| 1,126,324 | Weinstein | Jan. 26, 1915 |
| 1,391,890 | Green | Sept. 27, 1921 |